United States Patent
Griffin et al.

(10) Patent No.: US 12,423,435 B2
(45) Date of Patent: Sep. 23, 2025

(54) DYNAMIC BOOTING OF OPERATING SYSTEM BY DESIGNATING FIRST BASE BOOT PARTITION AS ACTIVE BOOT PARTITION RESPONSIVE TO DETECTING UNAUTHORIZED ATTEMPT TO ACCESS FIRST ENCRYPTED FILE

(71) Applicant: RED HAT, INC., Raleigh, NC (US)

(72) Inventors: Leigh Griffin, Kilmacthomas (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 94 days.

(21) Appl. No.: 18/362,636

(22) Filed: Jul. 31, 2023

(65) Prior Publication Data

US 2025/0045404 A1    Feb. 6, 2025

(51) Int. Cl.
  *G06F 21/57* (2013.01)
  *G06F 9/4401* (2018.01)
  *G06F 21/60* (2013.01)

(52) U.S. Cl.
  CPC .......... *G06F 21/575* (2013.01); *G06F 9/4401* (2013.01); *G06F 21/602* (2013.01); *G06F 2221/034* (2013.01)

(58) Field of Classification Search
  CPC .... G06F 21/575; G06F 9/4401; G06F 21/602; G06F 2221/034
  See application file for complete search history.

(56) References Cited

U.S. PATENT DOCUMENTS

| | | | |
|---|---|---|---|
| 10,963,464 B2 | 3/2021 | Eadon et al. | |
| 11,068,600 B2* | 7/2021 | Tomasso | G06F 21/575 |
| 11,194,635 B2 | 12/2021 | Carlen et al. | |
| 11,861,340 B2* | 1/2024 | Kauffman | G06F 8/63 |
| 2010/0241838 A1 | 9/2010 | Cohen et al. | |
| 2013/0318515 A1* | 11/2013 | Bowen | G06F 9/45558 717/168 |
| 2021/0247921 A1* | 8/2021 | Anderes | G11C 29/4401 |

FOREIGN PATENT DOCUMENTS

CN    116048628    5/2023

OTHER PUBLICATIONS

"How it works", https://mender.io/how-it-works, 9 pages.
Reidt, Teresa, "Mastering FOTA updates: An overview", May 23, 2023, emteria-GmbH, https://emteria.com/learn/fota-update, 15 pages.
"Seamless Update with A/B Partition System", https://vmware.github.io/photon/docs-v5/user-guide/a_b_partition_overview/, 2 pages.
Conway, Adam, "How A/B Partitions and Seamless Updates Affect Custom Development on XDA", Jul. 21, 2018, Xda-developers, https://www.xda-developers.com/how-a-b-partitions-and-seamless-updates-affect-custom-development-on-xda/, 21 pages.

* cited by examiner

*Primary Examiner* — Tammara R Peyton
(74) *Attorney, Agent, or Firm* — Dority & Manning, P.A.

(57) ABSTRACT

Systems and methods include storing, in a first base boot partition, an image of a first base operating system; storing, in a first overlay boot partition, a first overlay file system comprising a first encrypted file; configuring the first overlay boot partition to boot the image of the first base operating system from the first base boot partition and install the first overlay filesystem; and responsive to detecting an attempt to access the first encrypted file, designating the first base boot partition as an active boot partition.

20 Claims, 6 Drawing Sheets

Store a list of the plurality of disk partitions in a data file, wherein the data file comprises a plurality of records, wherein each record of the plurality of records corresponds to a partition of the plurality of disk partitions, wherein each partition of the plurality of disk partitions comprises at least one of a base boot partition, or an overlay boot partition
310

Store, in a first base boot partition, an image of a first base operating system
320

Store, in a first overlay boot partition, a first overlay file system comprising a first encrypted file
330

Configure the first overlay boot partition to boot the image of the first base operating system from the first base boot partition and install the first overlay filesystem
340

Responsive to detecting an attempt to access the first encrypted file, configure the first overlay boot partition to boot the first base operating system from the first base boot partition without installing the first overlay filesystem
350

FIG. 5

DYNAMIC BOOTING OF OPERATING SYSTEM BY DESIGNATING FIRST BASE BOOT PARTITION AS ACTIVE BOOT PARTITION RESPONSIVE TO DETECTING UNAUTHORIZED ATTEMPT TO ACCESS FIRST ENCRYPTED FILE

TECHNICAL FIELD

The present disclosure is generally related to operating systems, and more particularly, to dynamic booting operating system strategy.

BACKGROUND

A device's operating system manages the hardware and the software on which it is installed. An operating system can be specifically tailored to a particular device's functionality, thus limiting the uses the device can perform. Alternatively, an operating system can support a variety of functionalities. Operating systems can provide services for each of the functionalities supported by the operating systems.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Implementations of the disclosure are directed to providing a dynamic booting operating system strategy. A computing device can be, for example, an Internet of Things (IoT) device connected to a mesh network or an onboard computing device installed in a motor vehicle. A computing device's operating system can employ multiple components in order to support various applications running on the device. The components of an operating system (OS) can be divided into core OS components and service OS components. The core OS components are the components necessary to operate the device, such as, the kernel, the language stack, disk access, the system and service manager used to bootstrap user space and manager user processes, etc. The service OS components implement the services supporting the applications executable by the device. Some services can be required for the proper functioning of the device, while other services can be optional. Optional services can support additional features that are not related to the core functions of the device. For example, an operating system installed on a computing device in a motor vehicle can support required services related to the functional safety of the vehicle (e.g., the back-up camera, the radar cruise control), as well as optional services, such as those related to the infotainment system.

In some situations, unauthorized access to at least some components of an operating system may be undesired. As another example, in the automotive industry, a functional safety requirement may need to avoid the cross interference from different components of an automotive system. For example, if a non-functional safety certified application (e.g., a rear seat infotainment system) malfunctions or stops functioning, the running of a functional safety certified application (e.g., an auto-pilot system) should not be impacted. Thus, it is desired to control the component's access to certain applications of the operating system.

Aspects of the present disclosure address the above-noted and other deficiencies by introducing a dynamic booting operating system strategy, for example, through a boot manager that can manage the operating systems used for booting, meeting the dynamic needs from the clients. The computing device can create and maintain a data file that includes information identifying a pool of partitions for booting the operating system. Responsive to receiving a request from the client, the boot manager can determine, by selecting in the data file, a partition for booting.

Specifically, the computing device can create an operating system image and/or an overlay file system that residents in a disk partition. A hard disk used for running the operating systems can be divided into multiple disk partitions, and each disk partition can install the operating system image and/or the overlay file system. The operating system image can be presented as a collection of files that includes a base OS or one or more service OS layers. The base OS can include the minimum components necessary to operate a computing device, including, for example, the kernel, the language stack, and the system and service manager used to manage user's processes. The service OS layer can include a set of OS components, including, for example, drivers, libraries, executable files, configuration files. A service OS layer can enable the execution for the corresponding service by providing an interface between the service and the base OS. The overlay file system refers to one or more service OS layers described above and can include one or more encrypted files.

The computing device can create multiple partitions as described above. The computing device can maintain a list of the partitions and store the list in the data file. For example, the data file may include multiple records, where each record corresponds to a partition (e.g., a partition identifier). The computing device may label each partition with various metadata (e.g., parameters) before, during, or after creating the partition. The metadata can be used to determine which partition, from the list of the partitions, is to be selected and booted from to meet the dynamic needs of the clients. That is, the boot manager can detect a triggering event (e.g., receiving a request from a client) and provides a partition (e.g., an updated version of the original operating system, an upgraded or downgraded version of the original operating system, or a totally different operating system) corresponding to the triggering event to meet the clients' needs dynamically.

For example, to select a partition in the data file, the boot manager can compare information indicated by the trigger event with parameter values of the partitions included in the data file. The parameters can include an indicator indicating whether the partition contains proprietary software (e.g., licensing fee required), an indicator indicating the security level, an indicator indicating the priority, an indicator indicating the compatible OS (e.g., Android, Windows, iOS, MacOS, Linux, etc.), an indicator indicating the environmental factor (e.g., frequency of usage, workload capacity, etc.), or a flag indicating a specifical issue, etc. The parameters can also include a mounting parameter that indicates whether the operating system image mounts on any operating system images and (if any) a reference (e.g., a pointer) to the mounted operating system image(s).

For example, the selected partition may be a first base boot partition storing a first base operating system image, a first overlay boot partition storing a first overlay file system, a second base boot partition storing a second base operating system image, or a second overlay boot partition storing a second overlay file system. In some implementations, the boot manager may detect an unauthorized attempt to access the first overlay file system, and the boot manager can select the first base boot partition. In some implementations, the boot manager may detect an a request to update a base operating system image, and the boot manager can select a second base boot partition. In some implementations, the boot manager may detect an request to update an overlay file system, and the boot manager can select a second overlay boot partition that is configured to boot from the first base boot partition and install the second overlay filesystem. In some implementations, the boot manager may detect an a request to update a base operating system image and an overlay file system, and the boot manager can select a second overlay boot partition that is configured to boot from the second base boot partition and install the second overlay filesystem.

Upon selecting the partition, the boot manager can designate the selected partition as an active boot partition (e.g., by using a record in the metadata stored in the hard disk). The active boot partition defines the partition from which the system will boot. The boot manager may then boot the computing system from the selected partition.

Aspects of the present disclosure present advantages of booting an operating system that dynamically satisfies the booting requirements of a client. For example, aspects of the present disclosure may prevent unauthorized access to proprietary files such as the overlay file system. As another example, aspects of the present disclosure may make the update of the base operating system image and/or the update of the overlay file system manageable. The partition enables for efficient changes (e.g., upgrade or downgrade) of services provided to the user, enhanced updating management of the services provided to the user, and maximum security for the device by exposing the bare minimum functionality of the device to the user. Additionally, the partitions allow parallel distributing the operating systems to multiple clients.

Figure 1:
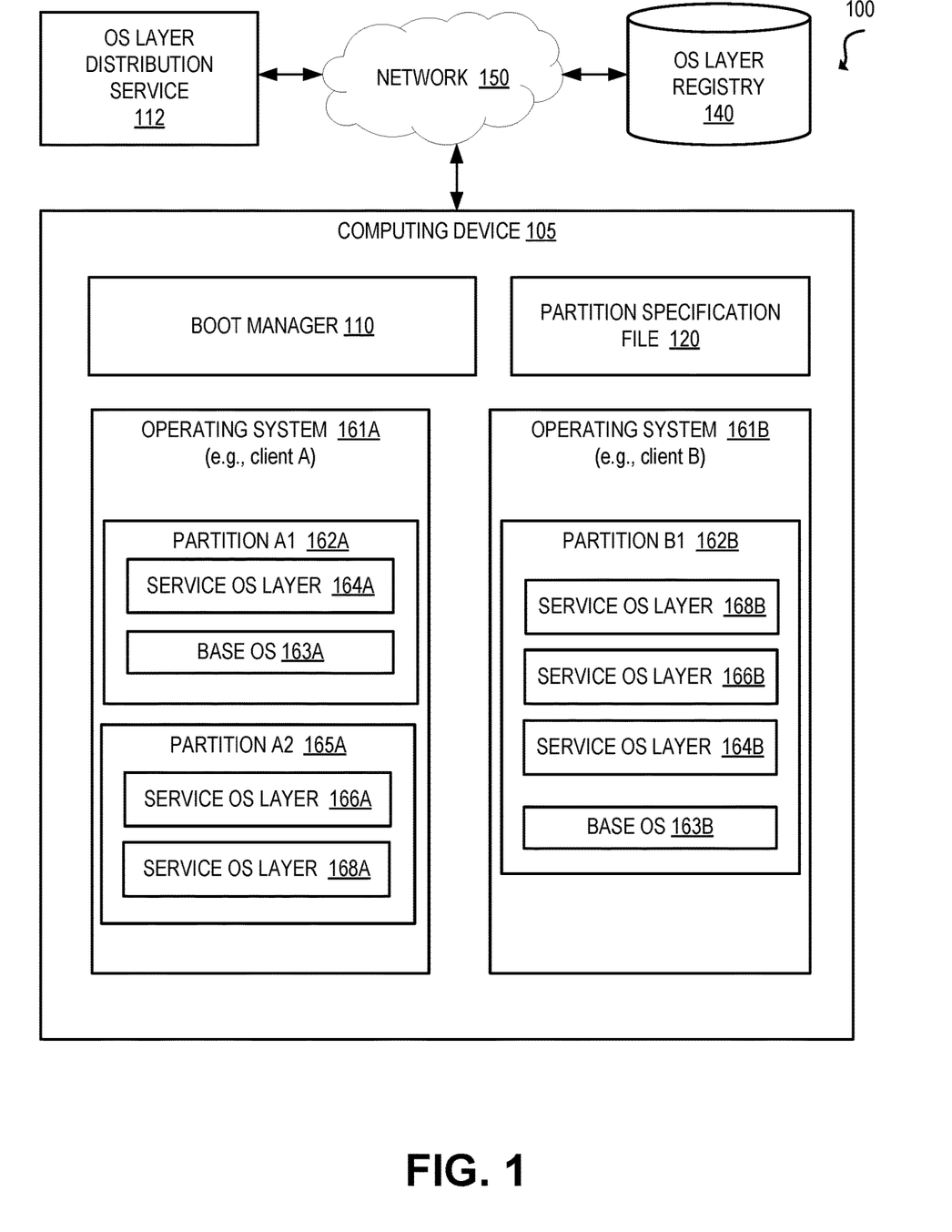
FIG. 1 depicts a block diagram of an example computing system operating in accordance with one or more aspects of the present disclosure.

FIG. 1 is a block diagram of a distributed computing system 100, in which embodiments of the present disclosure may operate. One skilled in the art will appreciate that other architectures are possible, and that the implementation of a computer system utilizing examples of the invention are not necessarily limited to the specific architecture depicted by FIG. 1.

The distributed computing system 100 includes a computing device 105 connected, via a network 150, to an OS layer distribution service 112, and/or an OS layer registry 140. The computing device 105 can include one or more processing devices communicatively coupled to memory devices and input/output devices. The computing device 105 can be a laptop computer, a tablet computer, a mobile phone (e.g., a smartphone), a computing device installed in motor vehicle, in an IoT object, as a part of a mesh network, or any suitable computing device. The OS layer distribution service 112 can include one or more computing devices, e.g., server computer systems. In some implementations, the OS layer registry 140 can be stored on the OS layer distribution service 112 computing device. In some implementations, the OS layer registry 140 and/or the OS layer distribution service 112 can be installed on the computing device 105.

Each computing device (e.g., the computing device 105 and/or the OS layer distribution service 112) can include additional resources not pictured in FIG. 1, such as one or more central processing units (CPU), main memory, which may include volatile memory devices (e.g., random access memory (RAM)), non-volatile memory devices (e.g., flash memory) and/or other types of memory devices, a storage device (e.g., one or more magnetic hard disk drives, a Peripheral Component Interconnect (PCI) solid state drive, a Redundant Array of Independent Disks (RAID) system, a network attached storage (NAS) array, etc.), and one or more devices (e.g., a Peripheral Component Interconnect (PCI) device, network interface controller (NIC), a video card, an input/output device, etc.). In certain implementations, the main memory may be non-uniform access (NUMA), such that memory access time depends on the memory location relative to CPU.

In some implementations, the OS layer registry 140 can be a centrally-located database. In some implementations, the OS layer registry 140 can be a database that stores one or more service OS layers corresponding to the services that support the various applications executable on the computing device 105. Each service OS layer can include a set of OS components, such as drivers, libraries, configuration files, resource usage requests, functionality priorities, user interface tasks, and/or interrupt protocols. The computing device 105 and/or the OS layer distribution service 112 can access the OS layer registry 140 to retrieve a service OS layer corresponding to a specific service. The OS layers in the OS layer registry 140 can be defined by the device manufacturer, and can be maintained, for example, by the OS layer distribution service 112. In some implementations, the OS layer distribution service 112 can implement updates to the OS layers in the OS layer registry 140, and can distribute updated OS layers in the OS layer registry 140 to computing device 105.

The OS layer distribution service 112 can communicate with the computing device 105 via an API, or other type of specified interface having operations that OS layer distribution service 112 can use to transmit OS layers to the computing device 105. The OS layer distribution service 112 can facilitate the distribution of the service OS layers stored in OS layer registry 140. The OS layer distribution service 112 can maintain the OS layer registry 140, including ensuring the OS layers are updated and functional. The OS layer distribution service 112 can receive requests from a computing device 105, and responsive to the request, can transmit the requested OS layer to the computing device 105.

The network 150 can be a private network (e.g., a local area network (LAN), a wide area network (WAN), intranet, etc.) or a public network (e.g., the Internet). In one example, the network 150 can include a wired or a wireless infrastructure, which can be provided by one or more wireless communications systems, such as a wireless fidelity (WiFi) hotspot connected with the network and/or a wireless carrier system that can be implemented using various data processing equipment, communication towers, etc. The computing device 105 can receive data via network 150 using an API, for example.

The computing device 105 can include a boot manager 110 and a partition specification file 120. The computing device 105 can create a set of partitions. As described above, a partition refers to an operating system image or an overlay file system that residents in a disk partition. A hard disk can be used for running the operating systems and can include multiple disk partitions, and the operating system image or an overlay file system can be installed in one of the disk partitions. In some implementations, the computing device 105 can partition the hard disk and create the hard disk partition on which to boot the operating system. Creating the disk partitions can include allocating a portion of the hard drive on which to segregate the operating system images and overlay file systems. The operating system images and/or overlay file systems may have distinct and separate interface requirements, thus preventing cross-communication.

Creating the disk partitions includes storing an operating system image and/or an overlay file system. The operating system image can be presented as a configuration file that includes a base OS or one or more service OS layers. The overlay file system can include one or more service OS layers. As described above, the base OS can be a standalone OS and can include the minimum components necessary to operate a computing device. The base OS can include, for example, the kernel, the language stack, and the system and service manager used to bootstrap user space and manage user processes. As described above, the OS layer is a set of OS components (e.g., drivers, libraries, configuration files, resource usage requests, functionality priorities, user interface tasks, interrupt protocols, and/or other information specific to the corresponding functionality) that support a specific service. In some implementations, the OS layers can be specific to the device, and can be defined by the device manufacturer. The OS layers can be stored in a registry (either stored locally on the device, or on a centralized database). The registry can include, for example, a table that lists the OS layer corresponding to each service executable by the device, as well as the priority of the service.

The computing device 105 can identify the base OS to be included in the OS bootable image, identify which service OS layer(s) to be included in the OS bootable image, or a combination thereof. In some implementations, the computing device 105 can identify any number of service OS layers to be booted with the base OS. In some implementations, the computing device 105 can identify no service OS layers to be booted with the base OS. The computing device 105 can receive the service OS layers from OS layer distribution 112. The service OS layers can support various applications executable by a computing device, according to the informational data stored in OS layer registry 140. For example, the data stored in OS layer registry 140 can include a field indicating which OS layer(s) are available to a computing device, and computing device 105 can install the available OS layer(s) in the computing device.

In some implementations, one partition (e.g., partition A2) can mount on another partition (e.g., partition A1), which means it combines multiple different underlying mount points into one, resulting in single directory structure that contains underlying files and sub-directories from all sources. This mounting would be reflected as a mounting parameter (as described below) of the partition (e.g., partition A2). As such, one partition can be used to initiate the booting of an operating system, but the booting would need the partition to mount on another partition, where both partitions are required to finish the booting. The computing device 105 can identify, when creating the partition, a partition on which the created partition mounts and label the partitions accordingly.

In some implementations, different partitions can include partially the same base OS or one or more service OS layers. For example, a first partition can include a first base OS and a first service OS layer; a second partition can include a second base OS and the first service OS layer; a third partition can include the first base OS and a second service OS layer; a fourth partition can include the first base OS, the first service OS layer, and the second service OS layer.

The computing device 105 can store partitions information in the partition specification file 120. The partition specification file 120 can be a data file that includes a list of partitions. A list of base OS and OS layers can be included in each partition. The partition specification file 120 can also include, for each partition, a set of parameters. The set of parameters can be used to label the partition so that, for different use cases, the boot manager 110 can select and use the corresponding partition(s) to boot. For example, the set of parameters can include an indicator indicating whether the partition contains proprietary software (e.g., licensing fee required), an indicator indicating the security level of the partition, an indicator indicating the priority of the partition, an indicator indicating the compatible OS (e.g., Android, Windows, iOS, MacOS, Linux, etc.) of the partition, an indicator indicating the environmental factor (e.g., frequency of usage, workload capacity, etc.) of the partition, or a flag indicating a specifical issue regarding the partition, etc. The set of parameters can include a mounting parameter that indicates whether the partition mounts on any partitions and (if any) a reference (e.g., a pointer) to the mounted partition(s).

The partition specification file 120 can further include, for example, a list of OS layers available to a computing device, and the list can indicate which of the OS layers has priority specific to the computing device. The partition specification file 120 can include multiple priorities for the OS layers, and the computing device 105 can in turn add OS layers to the base OS according to each priority. For example, the OS layers with the highest priority can be added to base OS first. As another example, the computing device 105 can provide an operating system to include all OS layers available to a computing device.

Before, during, or after creating the partition, the computing device 105 can set the values of parameters for each partition to label each partition accordingly. In some implementation, values of the parameters can be preset and used to identify the base OS and OS layers to be added to one partition by comparing the information of the base OS and OS layers and the preset values of the parameters. As an illustrative example in FIG. 1, computing device 105 can create a partition A1 162A. To create the partition A1 162A, computing device 105 can identify the base OS 163A and identify one service OS layer 164A to be booted with the base OS 163A. To identify the base OS 163A, the computing device 105 can identify an identifier (e.g., compatible OS) associated with the base OS 163A that matches a parameter of the partition A1 162A. To identify which (if any) of the service OS layers to boot with the base OS 163A, the computing device 105 can identify an indicator (e.g., a flag, or a priority) associated with the service OS layer 164A that matches a parameter of the partition A1 162A. The computing device 105 then adds the corresponding base OS 163A and/or the corresponding service OS layer 164A to the partition A1 162A. For example, the computing device 105 can determine to add the base OS 163A to the partition that has a corresponding OS "Linux," and/or determine to add the service OS layer 164A to the partition that has a corresponding priority of "1," or a flag value set to "0." As such, the base OS 163A and the service OS layer 164A make up the partition A1 162A.

As illustrated above, the computing device 105 creates and maintains (e.g., update) a list of partitions in a partition specification file 120 ready for use. When a client sends a request of booting operating system to the boot manager 110, the boot manager 110 can, based on the request, select the partition(s) in the partition specification file 120, and boot the partition(s) for operation. The boot manager 110 can receive a request including booting information. For example, the booting information can include a booting service identifier, a username and password combination, etc. The boot manager 110 can find one or more parameters of partitions stored in the partition specification file 120 that matches the booting information and thus determine the partition of the matched parameters as the partition to be sent to the client.

As an illustrative example in FIG. 1, the boot manager 110 can receive a request from client (e.g., client A), where the request includes booting information, and determine partition A2 165A and partition A1 162A corresponding to the request. For example, the booting information includes a first identifier of a first service OS layer and a second identifier of a second service OS layer. The boot manager 110 can compare the booting information with parameters of partitions in the partition specification file 120, and finds a match of the first identifier with one parameter of the partition A2 165A and a match of the second identifier with another parameter of the partition A2 165A. As such, the boot manager 110 determine that at least partition A2 165A corresponds to the request. The boot manager 110 can further identify the partition A1 162A for partition A2 165 to mount on, for example, based on the mounting parameter of partition A2 165. As such, the boot manager 110 can determine the partition A2 165 and partition A1 162A to be booted for the client A, responsive to the request. As such, partition A1 and partition A2 can be represented as an image including a copy of the base OS 163A bootable image, a copy of the service OS layer 164A, and a copy of the service OS layers 166A and 168A; and the boot manager 110 can use the image to boot the operating system 161A for client A.

Similarly, as an illustrative example in FIG. 1, the boot manager 110 can receive a request from client B, where the request includes booting information, and determine a partition B1 162B corresponding to the request. For example, the booting information includes an identifier (e.g., compatible OS) associated with the base OS and indicators (e.g., a flag, or a priority) associated with the service OS layers. The boot manager 110 can compare the booting information with parameters of partitions in the partition specification file 120, and finds a match of this identifier with one parameter of the partition B1 162B (thus identifying the base OS 163B) and a match of indicators with other parameters of the partition B1 162B (thus identifying three service OS layers 164B, 166B, 168B). As such, the boot manager 110 can determine the partition B1 162B to be booted for the client B, responsive to the request. As such, partition B1 can be represented as an image including a copy of the base OS 163B bootable image and a copy of the service OS layers 164B, 166B, and 168B; and the boot manager 110 can use the image to boot the operating system 161B for client B.

The boot manager 110 can boot the operating system 161A-B for the client A-B, respectively. One or more partitions can boot an operating system (e.g., operating system 161A, 161B). Once booted, the operating system 161A, 161B can operate and the client A-B may interact with the services provided by the operating system 161A-B, respectively.

The boot manager 110 may detect a triggering event associated with an operating system. The triggering event can includes receiving a user request, receiving a network notification, satisfying a condition of the first service, an expiration of a defined time period, or detection of a presence of another device (e.g., a smartphone or smart watch connected to the device, e.g., via Bluetooth). For example, the triggering event can be a user initiated request, such as a user selecting executing of a particular service via a user interface. The boot manager 110 can detect, intercept, or otherwise receive notification of a triggering event.

Figure 2A:
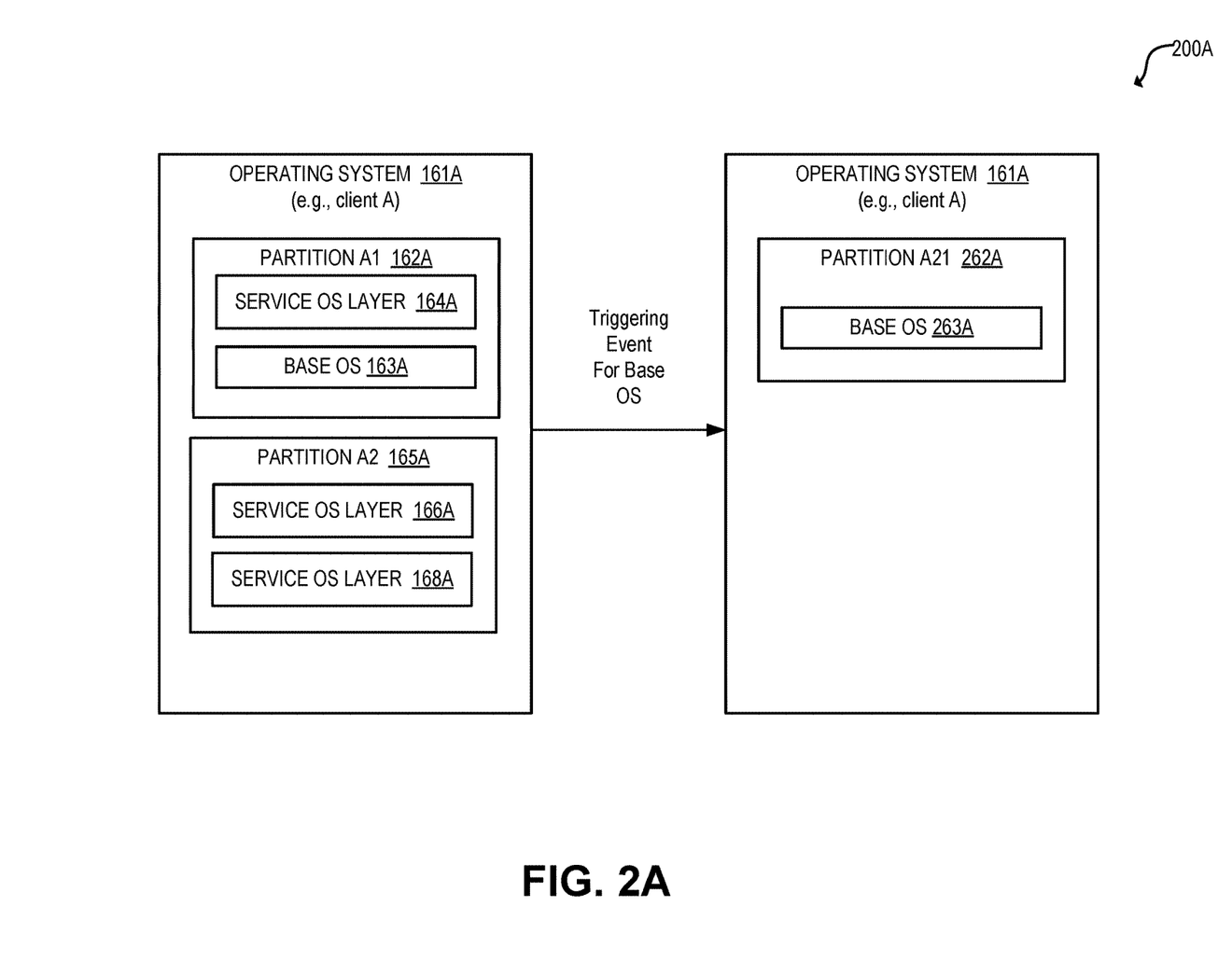
FIGS. 2A and 2B depict block diagrams of examples using dynamic booting operating system strategy in accordance with one or more aspects of the present disclosure.
Figure 2B:
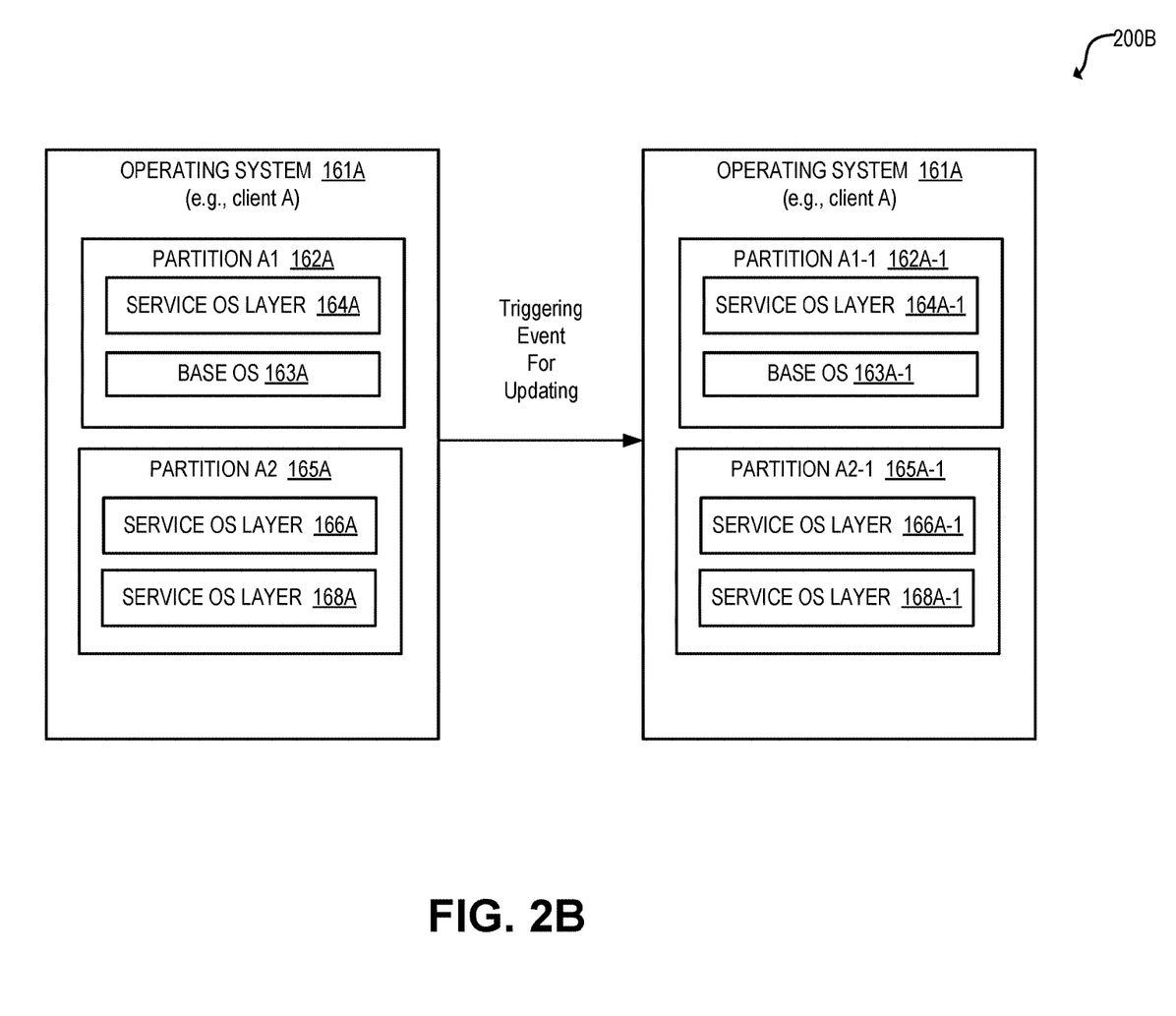

A triggering event can cause the boot manager 110 to boot a partition requested by the triggering event or switch the operating system from using the partition-in-use to using the partition requested by the triggering event. FIG. 2A illustrates an example of a switch from a full-service system (e.g., including both FOSS and proprietary software applications) to a partial-service system (e.g., including only FOSS applications). Although not illustrated in FIG. 2A, the boot manager can boot the partial-service system as a new boot without switch. FIG. 2B illustrates an example of updating the system, i.e., a switch for from an original system to an updated system.

Referring to FIG. 2A, boot manager 110 determines and uses the partitions A1 162A and partitions A2 1165A to boot the operating system 161A. The booted operating system 161A includes the service provided by the base OS 163A and the service OS layers 164A, 166A, and 168A. In some implementations, upon detecting a triggering event (e.g., a user request of no longer paying licensing fees), the boot manager 110 can determine partition A21 262A by selecting, in the partition specification file 120, a partition that only contains a base OS, and uses the partitions A21 262A to reboot the operating system 161A, where the partitions A21 262A includes a base OS 263A. In some implementations, responsive to detecting an unauthorized attempt to access an encrypted file associated with the service OS layers 164A, 166A, and/or 168A, boot manager 110 can configure the partition A2 to boot the base operating system from the partition A21 without installing the overlay filesystem included in the partition A2.

Referring to FIG. 2B, boot manager 110 determines and uses the partitions A1 162A and partitions A2 1165A to boot the operating system 161A. The booted operating system 161A includes the service provided by the base OS 163A and the service OS layers 164A, 166A, and 168A. In some implementations, upon detecting a triggering event (e.g., a system request to update), the boot manager 110 can determine partition A1-1 by selecting, in the partition specification file 120, a partition that has been updated over partition A1. The boot manager 110 can also determine that the partition A2 mounts on partition A1 and check whether there is an update to partition A2. Responsive to determining that there is no update on partition A2, the boot manager 110 can select partition A2 along with the partition A1-1. Responsive to determining that there is an update on partition A2, the boot manager 110 can select the updated partition A2-1 to be booted along with the partition A1-1 (which is the case illustrated in FIG. 2B).

In some implementations, upon detecting a triggering event (e.g., a system request to update), the boot manager 110 can determine partition A2-1 by selecting, in the partition specification file 120, a partition that has been updated over partition A2. The boot manager 110 can also determine that the partition A2 mounts on partition A1 and check whether there is an update to partition A1. Responsive to determining that there is no update on partition A1, the boot manager 110 can select partition A1 along with the partition A2-1. Responsive to determining that there is an update on partition A1, the boot manager 110 can select the updated partition A1-1 to be booted along with the partition A2-1 (which is the case illustrated in FIG. 2B).

As one example shown in FIG. 2B, boot manager 110 determines and uses the partitions A1-1 162A-1 and A2-1 165A-1 to reboot the operating system 161A, where the partitions A1-1 162A-1 262A includes an updated base OS 263-1A and an updated service OS layer 164A-1, and the partitions A2-1 165A-1 includes an updated service OS layers 166A-1 and 168A-1. Although FIG. 2B illustrates a scenario that each component in each partition has been updated, one or more components of one or more partitions can be not updated as long as there is one component update. Because boot manager 110 has access to both partitions with and without update, boot manager 110 can dynamically switch between an original system and an updated system. In some implementations, during or after switching, the boot manager 110 can stop operation of the original operating system, delete the original partition, release the resources used by the operation of the original operating system, and enable user access to the service(s) provided by the new operating system.

Although not illustrated in FIGS. 2A and 2B, in some embodiments, the boot manager 110 may detect, as a triggering event, the presence of a correlated second device. For example, the first device can be a processing device installed on a car's computer system, and the presence of a smart phone connected to the computing device (e.g., via Bluetooth®) can be a triggering event detected by boot manager 110. Such a triggering event may trigger a multi-step authentication factor, and may trigger switching the operation from the first operating system to the second operating system. As another example, the detection of a correlated second device may trigger the addition of a service to the base OS, such as adding the device to a mesh network.

In some implementations, the triggering event can cause the computing device 105 to add a service OS layer to a partition, or to create an additional partition. For example, the computing device 105 can create a tertiary OS that includes a copy of the base OS along with additional service OS layers. Responsive to a triggering event, the boot manager 110 can then switch from the base OS to the tertiary OS. In some implementations, the triggering event can cause the computing device 105 to add a service OS layer to base OS. Adding a service OS layer to the base OS includes installing the corresponding OS layer over the base OS.

In some implementations, the boot manager 110 can store a list of triggering events and their corresponding actions and correlated services. The boot manager 110 can identify, in the list, the service corresponding to the detected triggering event. In some implementations, the boot manager 110 can send a request to OS layer distribution service 112, requesting the OS layer corresponding to the identified service. The boot manager 110 can then add or update the OS layer received from the OS distribution service 112, according to the triggering event. In some embodiments, the OS layer may be stored locally on computing device 105, in which case the OS layer manager 110 can install or update the OS layer corresponding to the identified service. In some embodiments, the triggering event triggers the removal of a functionality, in which the boot manager 110 can remove the service OS layer corresponding to the identified service.

Referring back to FIGS. 1 and 2A, as an illustrative example, the computing device 105 can be an onboard computing device installed in a motor vehicle. The client A can send a request, to the computing device 105, to boot the operating system of the computing device 105. The request can include a booting service identifier. The boot manager 110 can search, in the partition specification file 120, one or more parameters of a partition that match the booting service identifier. For example, the boot manager 110 finds that one or more parameters of partition A2 165A match the booting service identifier. The boot manager 110 checks, for example, in the record of partition A2 165A, whether the partition A2 165A needs mounting on another partition. The boot manager 110 may find that partition A2 165A needs mounting on partition A1 162A. The boot manager 110 may determine the partition A1 162A and partition A2 165A to be booted. The boot manager 110 can boot the operating system and operate with the services provided by the partition A1 162A and partition A2 165A. For example, the service OS layer 164A included in the partition A1 162A can support the execution of a back-up camera in the motor vehicle, the service OS layer 166A included in the partition A2 165A can support the execution of a road service device in the motor vehicle, and the service OS layer 168A included in the partition A2 165A can support the execution of a temperature sensor in the motor vehicle.

The boot manager 110 can detect a triggering event, such as a user request to downgrade the service (e.g., a change to the booting service identifier). After detecting the triggering event, the boot manager 110 can search, in the partition specification file 120, one or more parameters of a partition that match the changed booting service identifier. For example, the boot manager 110 finds that one or more parameters of partition A21 262A match the changed booting service identifier. The boot manager 110 checks, for example, in the record of partition A21 262A, whether the partition A21 262A needs mounting on another partition. The boot manager 110 may find that partition A2 165A does not need mounting on another partition. The boot manager 110 can boot the operating system and operate with the services provided by partition A21 262A, which, in this case, only covers the base OS 263A. As such, the boot manager 110 can efficiently provide a booting operating system meeting the dynamic needs from clients.

Figure 3:
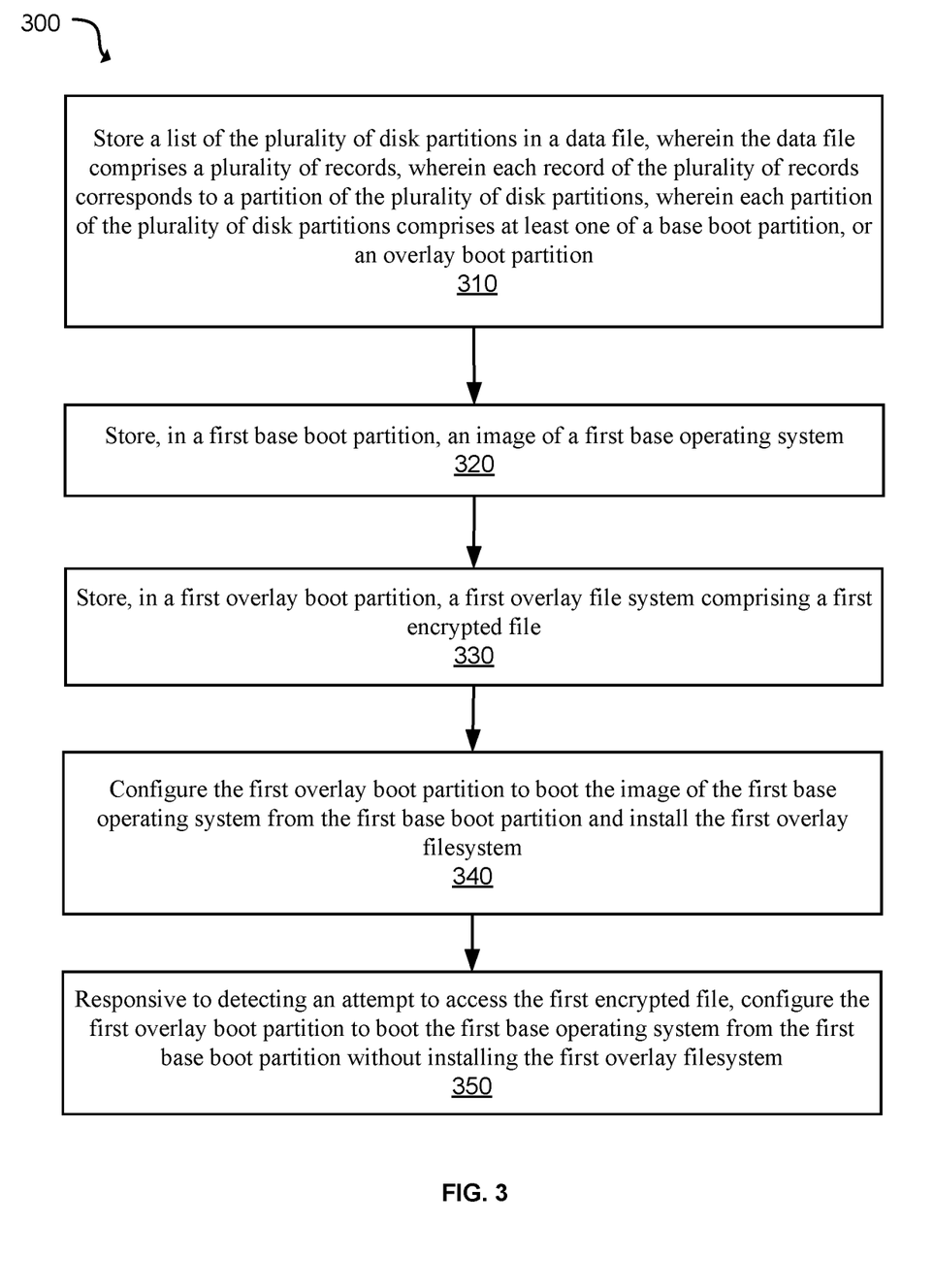
FIG. 3 is a flow diagram of an example method for implementing dynamic booting operating system strategy, in accordance with one or more aspects of the present disclosure.

FIG. 3 depicts a flow diagram of an example method 300 for implementing dynamic booting operating system strategy, in accordance with one or more aspects of the present disclosure. Method 300 may be performed by processing logic (e.g., in computing device 105 of FIG. 1) that may comprise hardware (e.g., circuitry, dedicated logic, programmable logic, microcode, etc.), software (such as instructions run on a processing device), firmware, or a combination thereof. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). In one embodiment, method 300 may be performed by the boot manager 110 of FIG. 1.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At operation 310, the processing logic can maintain a list of a plurality of partitions, wherein each disk partition of the plurality of disk partitions comprises at least one of a base boot partition, or an overlay boot partition. In some implementations, the processing logic can create a first hard disk partition on which to store the first operating system image. In some implementations, the processing logic can create a second hard disk partition on which to store the first overlay file system. User access to the hard disk partition can be enabled. That is, the user can access the service provided by booting the operating system from the hard disk partition.

In some implementations, the processing logic can boot from the first partition to provide a first service. To provide the first service, the processing logic can install, over the base OS, a first OS layer corresponding to the first service. The first OS layer includes operating system components that provide the first service, such as a driver, a configuration file, a priority, an interrupt protocol, and/or a user interface task. In some implementations, processing logic can identify the first service provided by the first operating system image based on a priority of the first service. Processing logic can identify a priority for each service available to the device. The priorities can be identified based on determined data (e.g., each service can have preset priority defined by the device manufacturer in the OS layer registry). For example, the device manufacturer can define that the rear-view back-up camera functionality takes priority over the infotainment functionality by assigning a higher priority to the OS layer (s) that supports executing of the rear-view back-up camera. In some implementations, processing logic can identify a flag for each service available to the device (e.g., as defined in the OS layer registry). The first service provided by the first operating system image can be identified based on a flag. For instance, a value of "0" can indicate that the corresponding service is to be included in the first operating system image. As such, the processing logic can create a plurality of hard disk partitions on each of which to store an operating system image or an overlay file system including one or more files (e.g., encrypted) that represent different OS layers.

At operation 320, the processing logic can store, in a first base boot partition, an image of a first base operating system. At operation 330, the processing logic can store, in a first overlay boot partition, a first overlay file system comprising a first encrypted file. At operation 340, the processing logic can configure the first overlay boot partition to boot the image of the first base operating system from the first base boot partition and install the first overlay file system. That is, for example, in a default setting, the processing logic allows a user to boot a system with the first based operating system with the overlay file system installed.

In some implementations, responsive to a request received from a user, the processing logic can determine one partition of the plurality of partitions. In some implementations, the processing logic can receive (e.g., from a first user) a request including information corresponding to one or more parameters of the partitions. For example, the information corresponding to one or more parameters can include a booting service identifier, a username and password combination, etc. The processing logic can find metadata of the partitions stored in the partition specification file 120 that matches the information and thus determine the partition of the matched metadata as the partition to boot from. In some implementations, the processing logic may boot, using a first operating system image residing in a first disk partition with a first overlay file system residing in a second disk partition installed, a first operating system.

For example, the first operating system image includes a base OS. The base OS can include the minimum components necessary to operate the device. The base OS can be a standalone operating system provided by an OS provider, and can include, for example, the kernel, the language stack, a system and service manager used to bootstrap user space and manager user processes, etc. In some implementations, the first operating system image includes a first service. In some implementations, the first service can enable a function related to the core function of the device on which the base OS is running. In some embodiments, the first service can enable a security-related function of the device, such as a functional safety function (e.g., a back-up camera on a motor vehicle), or a login authentication service (e.g., a username and password combination on a laptop). In some implementations, the first overlay file system includes a second service. In some implementations, the second service can enable a function unrelated to the core function of the device on which the base OS is running. In some embodiments, the second service can enable a requested (e.g., by a user instruction) function of the device.

At operation 340, responsive to detecting an unauthorized attempt to access the first encrypted file, the processing logic can designate the first base boot partition as an active boot partition. That is, when the attempt to access the first encrypted file is an unauthorized attempt, the processing logic allows a user to boot a system with the first based operating system without the overlay file system installed. In some implementations, the attempt to access the first encrypted file can be a request to access a system, and the request does not contain an authorization to the overlay file system, and thus can be considered as unauthorized attempt.

In some implementations, the processing logic can create a second base boot partition and a second overlay boot partition. The processing logic can store, in the second base boot partition, an image of a second base operating system, and store, in the second overlay boot partition, a second overlay file system comprising a second encrypted file. In some implementations, the processing logic can designate the first overlay boot partition, the second base boot partition, or the second overlay boot partition as the active boot partition.

In some implementations, the second encrypted file comprises an updated version of the first encrypted file, and the processing logic can, responsive to detecting a request for an update of the first encrypted file, configure the second overlay boot partition to boot the image of the first base operating system from the first base boot partition and install the second overlay filesystem and designate the second overlay boot partition as an active boot partition. In some implementations, the second base operating system comprises an updated version of the first base operating system, and the processing logic can, responsive to detecting a request for an update of the first base operating system, configure the first overlay boot partition to boot the image of the second base operating system from the second base boot partition and install the first overlay filesystem and designate the first overlay boot partition as an active boot partition. In some implementations, the second base operating system comprises an updated version of the first base operating system and the second encrypted file comprises an updated version of the first encrypted file, and the processing logic can, responsive to detecting a request for an update of the first base operating system and the first encrypted file, configure the second overlay boot partition to boot the image of the second base operating system from the second base boot partition and install the second overlay filesystem and designate the second overlay boot partition as an active boot partition.

In some implementations, the processing logic can, responsive to detecting a triggering event, configuring a second overlay boot partition to boot a second base operating system from a second base boot partition and install a second overlay filesystem. The triggering event can be receiving a user request, receiving a network notification, satisfying a condition of a service included in the first operating system image (e.g., first service lifecycle event), an expiration of a defined time period, or detection of a presence of another device (e.g., a smartphone or smart watch connected to the device, e.g., via Bluetooth). For example, the triggering event can be satisfying a condition of the first service, such as receiving a valid username and password combination.

In some implementations, the processing logic can receive a triggering event that triggers the removal of the service included in the first operating system (e.g., the first service), create a second disk partition that stores only the base OS file, and boot a second operating system from the second disk partition. In some implementations, the processing logic can receive a triggering event that triggers obtaining an update of the service included in the first operating system (e.g., an updated first service), create a second disk partition that stores the base OS file and the updated first service file, and boot a second operating system from the second disk partition. In some implementations, processing logic can receive a triggering event that triggers the addition of a service to the first operating system, create a second disk partition that stores the first operating system file with the additional service file, and boot a second operating system from the second disk partition.

Figure 4:
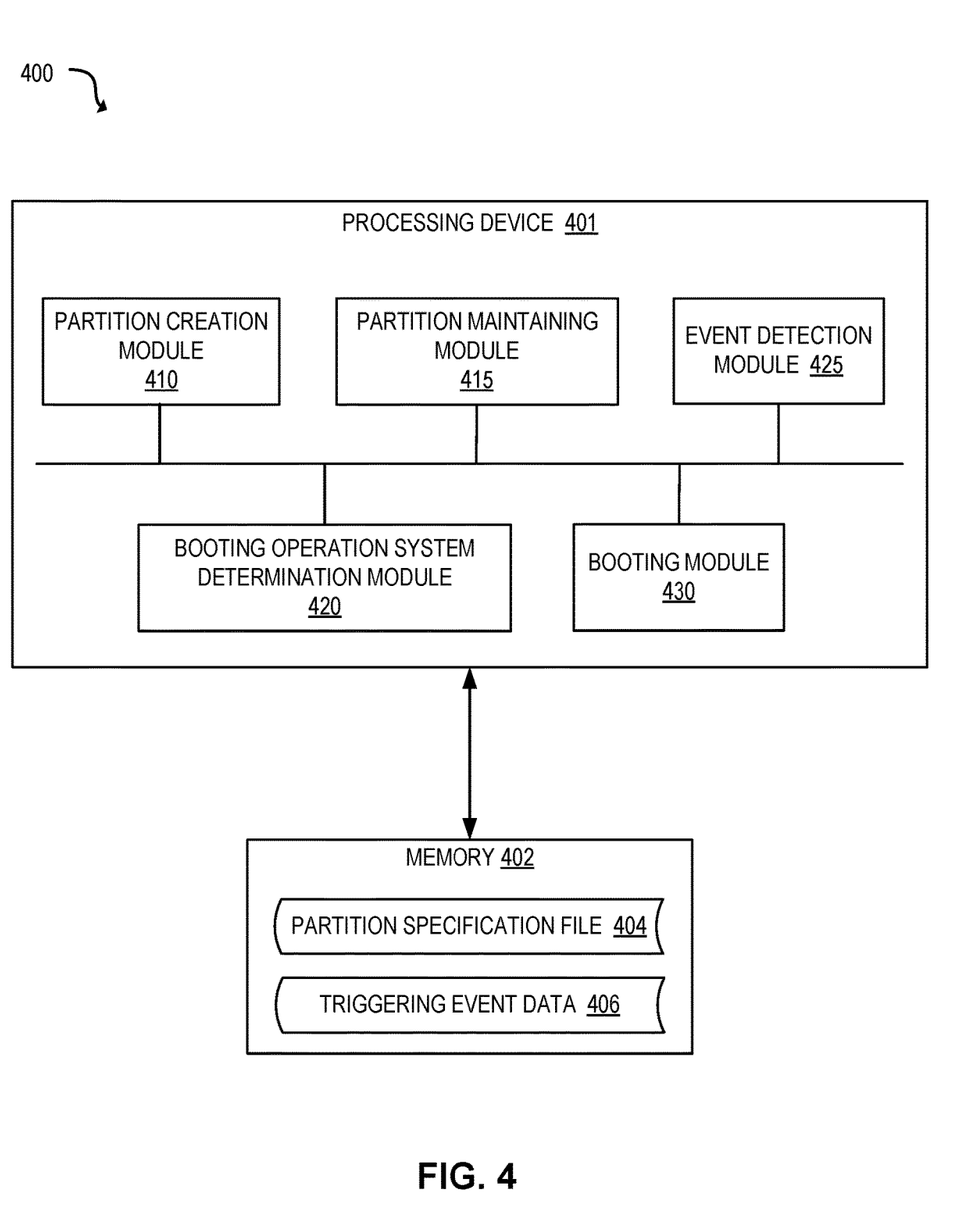
FIG. 4 depicts a block diagram of an example computer system operating in accordance with one or more aspects of the present disclosure.

FIG. 4 depicts a block diagram of a computer system 400, operating in accordance with one or more aspects of the present disclosure. Computer system 400 may be the same or similar to computing device 105 of FIG. 1. Examples of the computing device 105 include, but are not limited to, a processing device installed in a communication device, in a motor vehicle, a processing device installed in an IoT object (e.g., a wearable smart watch, a thermostat, etc.), a processing device installed in an object that is part of a mesh network, a processing device installed in an implanted device, a processing device installed in laptop computer, a processing device installed in a tablet computer, a processing device installed in a mobile phone (e.g., a smartphone), or any other appropriate processing device. Computer system 400 may include a partition creation module 410, a partition maintaining module 415, a booting operating system determination module 420, an event detection 425, and/or a booting module 430. Computer system 400 can also include a memory 402 that can store partition specification file 404 and/or triggering event data 406.

The partition creating module 410 may enable a processor to create partitions. The partition can be presented as an operating system image or overlay file system that includes a base OS or one or more service OS layers residing in a disk partition. Creating the disk partitions can include allocating a portion of the hard drive on which to segregate the operating system images and/or overlay file systems. The first operating system image and the second operating system image may have distinct and separate interface requirements, thus preventing cross-communication. For example, tasks operating on the first operating system are prevented from accessing the second operating system, and vice versa. To create partitions, the partition creating module 410 can set the parameters for each partition, and identify the base OS and OS layers to be added in each partition according to a match between the component(s) with one of the set of parameters. The partition creation module 410 can identify the base OS to be included in the partition, identify which service OS layer(s) to be included in the partition, or a combination thereof. In some implementations, one partition (e.g., partition A2) can mount on another partition (e.g., partition A1), which means it combines multiple different underlying mount points into one, resulting in single directory structure that contains underlying files and sub-directories from all sources. The partition creation module 410 can identify, when creating the partition, a partition on which the created partition mounts.

The partition maintaining module 415 may enable a processor to update and store a list of the created partitions in a partition specification file 404. The partition specification file 404 can include a list of partitions and a list of base OS and OS layers included in each partition. The partition specification file 404 can also include, for each partition, a set of parameters. The set of parameters can be used to label the partition so that, for different use cases, the processing device 401 can select and use the corresponding partition(s) to boot. For example, the set of parameters can include an indicator indicating whether the partition contains proprietary software (e.g., licensing fee required), an indicator indicating the security level of the partition, an indicator indicating the priority of the partition, an indicator indicating the compatible OS (e.g., Android, Windows, iOS, MacOS, Linux, etc.) of the partition, an indicator indicating the environmental factor (e.g., frequency of usage, workload capacity, etc.) of the partition, or a flag indicating a specifical issue regarding the partition, etc. The set of parameters can include a mounting parameter that indicates whether the partition mounts on any partitions and (if any) a reference (e.g., a pointer) to the mounted partition(s).

The booting operating system determination module 420 may enable a processor to select, based on a request, the partition(s) in the partition specification file 404. The request may include booting information associated with a client. For example, the booting information can include a booting service identifier, a username and password combination, etc. The boot manager 110 can find one or more parameters of partitions stored in the partition specification file 120 that matches the booting information and thus determine the partition of the matched parameters as the partition to be booted for client.

The booting module 430 may enable a processor to boot a system from the partition determined by the booting operating system determination module 420. The booting module 430 may designate the determined partition as an active boot partition.

The triggering event detection module 425 may enable a processor to detect triggering events. A triggering event can be a user request, a network notification, satisfaction of a condition specified by a service, an expiration of a specified time period, and/or a detection of the presence of another device (e.g., within a mesh network). It should be appreciated that other triggering events are envisioned. Detection of a triggering event can trigger the addition of functionality to the base OS, or can trigger the switch from the first operating system to the second operating system. For example, the first service provided by the first operating system can be a security service, and the event detection module 425 may receive user input provided via a user interface. The user input can be, for example, a valid username and password combination. Receiving the valid username and password combination may trigger a condition associated with the first service, which may lead to switching from the first operating system to the second operating system. As another example, receiving a valid username and password combination may trigger the addition of a second service to the first operating system. The second service can enable a second verification in a multi-step user authentication, such as a biometric authentication. As another example, the event detection module 425 may detect that a defined time period has elapsed since the first operating system was booted (e.g., 30 seconds), which may trigger the switch from the first operating system to the second operating system.

In some implementations, a list of triggering events may be stored in memory 402 as triggering event data 406. The triggering event data 406 can correlate events with corresponding actions. The triggering event data 406 can list events corresponding to the services supporting the various applications executable by the device, along with the action to take responsive to detecting the event. For example, the triggering event data 406 can include a table, and each entry the table can list a triggering event, the associated service, and the action or actions to take responsive to detecting the triggering event. As an illustrative example, an entry in the table can include a triggering event for receiving a valid username and password combination from a first authentication service, and the associated action can be to add the second authentication service to the operating system. Another entry can include a triggering event for receiving a valid biometric authentication from the second authentication service, and the associated action can be to switch operation from the first operating system to the second operating system.

Figure 5:
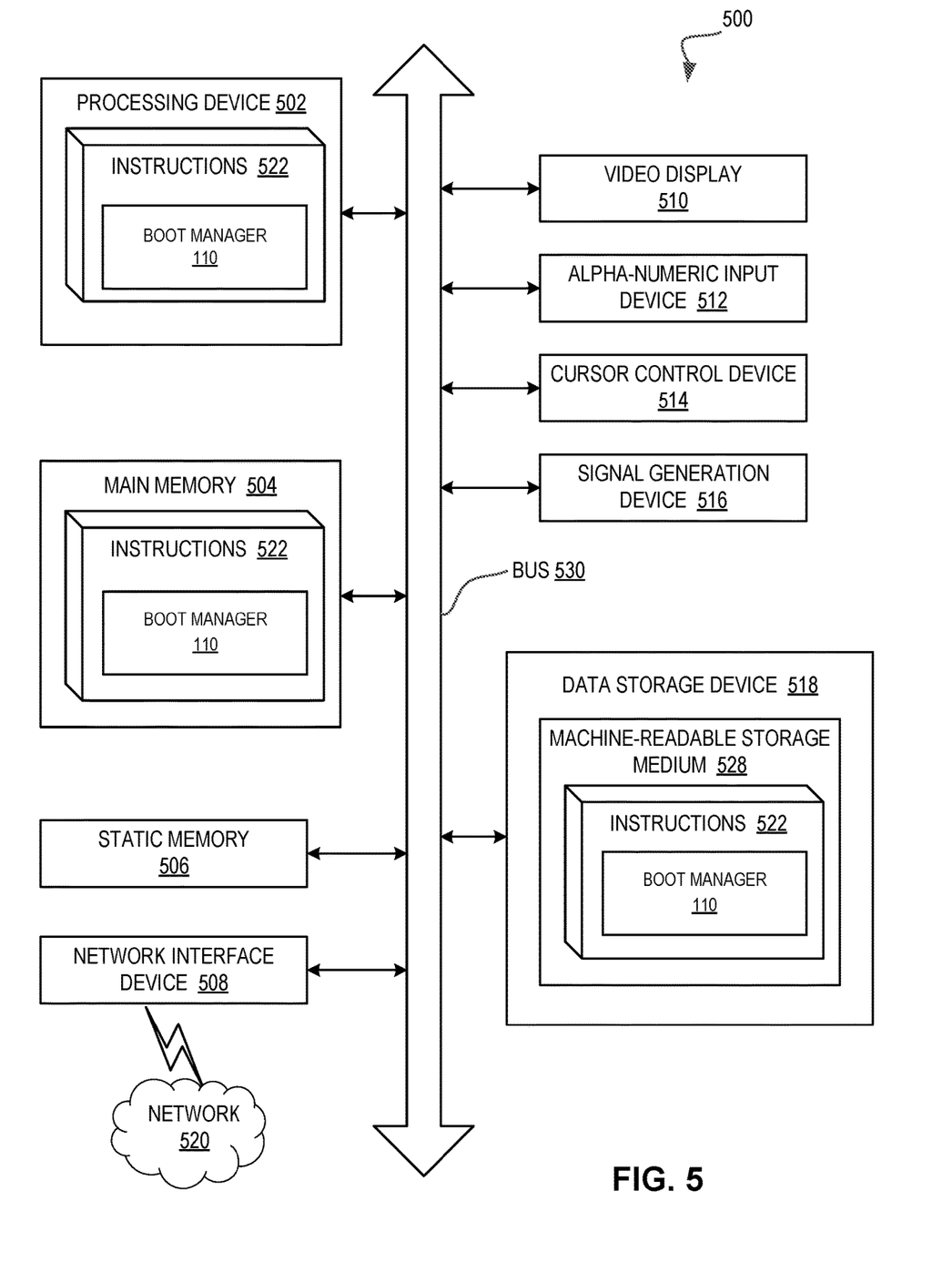
FIG. 5 depicts a block diagram of an illustrative computer system operating in accordance with one or more aspects of the present disclosure.

FIG. 5 is a diagrammatic representation of a machine in the exemplary form of a computer system 500 within which a set of instructions for causing the machine to perform any one or more of the methodologies discussed herein may be executed. In various illustrative examples, computer system 500 may correspond to computing device 105 of FIG. 1 and/or computer system 400 of FIG. 4. Computer system 500 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In some implementations, computer system 500 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 500 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 500 may include a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 502 may also be one or more special-purpose processing devices such as an application specific integrated circuit (ASIC), a field programmable gate array (FPGA), a digital signal processor (DSP), network processor, or the like. Processing device 502 may be configured to execute boot manager 110 for programming the operations and steps discussed herein.

Computer system 500 may further include a network interface device 508. Computer system 500 may also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., boot manager 110) embodying any one or more of the methodologies of functions described herein. The boot manager 110 may also reside, completely or at least partially, within main memory 504 and/or within processing device 502 during execution thereof by computer system 500; main memory 504 and processing device 502 also constituting machine-readable storage media. boot manager 110 may further be transmitted or received over a network 526 via network interface device 508.

Machine-readable storage medium 520 may also be used to store the device queue manner logic persistently. While machine readable storage medium 520 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "storing," "configuring," "detecting," "designating," "creating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
storing, in a first base boot partition, an image of a first base operating system;
storing, in a first overlay boot partition, a first overlay filesystem comprising a first encrypted file;
configuring the first overlay boot partition to boot the image of the first base operating system from the first base boot partition and install the first overlay filesystem;
receiving a request to access the first encrypted file, wherein the request does not contain an authorization to access the first overlay boot partition;
responsive to determining that the request does not contain the authorization to access the first overlay boot partition, detecting an unauthorized attempt to access the first encrypted file; and
responsive to detecting the unauthorized attempt to access the first encrypted file, designating the first base boot partition as an active boot partition.

2. The method of claim 1, further comprising:
responsive to detecting an authorized attempt to access the first encrypted file, designating the first overlay boot partition as the active boot partition.

3. The method of claim 1, further comprising:
creating a second base boot partition and a second overlay boot partition;
storing, in the second base boot partition, an image of a second base operating system; and
storing, in the second overlay boot partition, a second overlay filesystem comprising a second encrypted file.

4. The method of claim 3, wherein the second encrypted file comprises an updated version of the first encrypted file, further comprising:
responsive to detecting a request for an update of the first encrypted file, configuring the second overlay boot partition to boot the image of the first base operating system from the first base boot partition and install the second overlay filesystem; and
designating the second overlay boot partition as the active boot partition.

5. The method of claim 3, wherein the second base operating system comprises an updated version of the first base operating system, further comprising:

responsive to detecting a request for an update of the first base operating system, configuring the first overlay boot partition to boot the image of the second base operating system from the second base boot partition and install the first overlay filesystem; and designating the first overlay boot partition as the active boot partition.

6. The method of claim 3, wherein the second base operating system comprises an updated version of the first base operating system and the second encrypted file comprises an updated version of the first encrypted file, further comprising:

responsive to detecting a request for an update of the first base operating system and the first encrypted file, configuring the second overlay boot partition to boot the image of the second base operating system from the second base boot partition and install the second overlay filesystem; and designating the second overlay boot partition as the active boot partition.

7. The method of claim 1, wherein the first overlay filesystem comprises an operating system component associated with a first service, wherein the operating system component is represented by one of: a driver, or a configuration file.

8. The method of claim 1, further comprising:

storing a list of a plurality of disk partitions in a data file, wherein the data file comprises a plurality of records, wherein each record of the plurality of records corresponds to a partition of the plurality of disk partitions, wherein each disk partition of the plurality of disk partitions comprises at least one of: a base boot partition, or an overlay boot partition.

9. The method of claim 3, further comprising:

responsive to detecting a triggering event, configuring the second overlay boot partition to boot the second base operating system from the second base boot partition and install the second overlay filesystem, wherein the triggering event comprises at least one of: receiving a user request, receiving a network notification, satisfying a condition associated with a first service, an expiration of a defined time period, or detection of a presence of a second device.

10. A system comprising:

a memory; and a processing device operatively coupled to the memory, the processing device to perform operations comprising:

storing, in a first base boot partition, an image of a first base operating system;

storing, in a first overlay boot partition, a first overlay filesystem comprising a first encrypted file;

configuring the first overlay boot partition to boot the image of the first base operating system from the first base boot partition and install the first overlay filesystem;

receiving a request to access the first encrypted file, wherein the request does not contain an authorization to access the first overlay boot partition;

responsive to determining that the request does not contain the authorization to access the first overlay boot partition, detecting an unauthorized attempt to access the first encrypted file; and responsive to detecting the unauthorized attempt to access the first encrypted file, designating the first base boot partition as an active boot partition.

11. The system of claim 10, wherein the operations further comprise:

responsive to detecting an authorized attempt to access the first encrypted file, designating the first overlay boot partition as the active boot partition.

12. The system of claim 11, wherein the operations further comprise:

creating a second base boot partition and a second overlay boot partition;

storing, in the second base boot partition, an image of a second base operating system; and storing, in the second overlay boot partition, a second overlay filesystem comprising a second encrypted file.

13. The system of claim 12, wherein the second encrypted file comprises an updated version of the first encrypted file, wherein the operations further comprise:

responsive to detecting a request for an update of the first encrypted file, configuring the second overlay boot partition to boot the image of the first base operating system from the first base boot partition and install the second overlay filesystem; and designating the second overlay boot partition as the active boot partition.

14. The system of claim 12, wherein the second base operating system comprises an updated version of the first base operating system, wherein the operations further comprise:

responsive to detecting a request for an update of the first base operating system, configuring the first overlay boot partition to boot the image of the second base operating system from the second base boot partition and install the first overlay filesystem; and designating the first overlay boot partition as the active boot partition.

15. The system of claim 12, wherein the second base operating system comprises an updated version of the first base operating system and the second encrypted file comprises an updated version of the first encrypted file, wherein the operations further comprise:

responsive to detecting a request for an update of the first base operating system and the first encrypted file, configuring the second overlay boot partition to boot the image of the second base operating system from the second base boot partition and install the second overlay filesystem; and designating the second overlay boot partition as the active boot partition.

16. The system of claim 10, wherein the first overlay filesystem comprises an operating system component associated with a first service, wherein the operating system component is represented by one of: a driver, or a configuration file.

17. The system of claim 15, wherein the operations further comprise:

storing a list of a plurality of disk partitions in a data file, wherein the data file comprises a plurality of records, wherein each record of the plurality of records corresponds to a partition of the plurality of disk partitions, wherein each disk partition of the plurality of disk partitions comprises at least one of: a base boot partition, or an overlay boot partition.

18. The system of claim 12, wherein the operations further comprise:

responsive to detecting a triggering event, configuring the second overlay boot partition to boot the second base operating system from the second base boot partition and install the second overlay filesystem, wherein the triggering event comprises at least one of: receiving a user request, receiving a network notification, satisfying a condition associated with a first service, an expiration of a defined time period, or detection of a presence of a second device.

19. A non-transitory computer-readable media storing instructions that, when executed, cause a processing device to perform operations comprising:
- storing, in a first base boot partition, an image of a first base operating system;
- storing, in a first overlay boot partition, a first overlay filesystem comprising a first encrypted file;
- configuring the first overlay boot partition to boot the image of the first base operating system from the first base boot partition and install the first overlay filesystem;
- receiving a request to access the first encrypted file, wherein the request does not contain an authorization to access the first overlay boot partition;
- responsive to determining that the request does not contain the authorization to access the first overlay boot partition, detecting an unauthorized attempt to access the first encrypted file; and
- responsive to detecting the unauthorized attempt to access the first encrypted file, designating the first base boot partition as an active boot partition.

20. The non-transitory computer-readable media of claim 19, wherein the operations further comprise:
- responsive to detecting an authorized attempt to access the first encrypted file, designating the first overlay boot partition as the active boot partition.

* * * * *